US012271131B2

(12) United States Patent
Fujita

(10) Patent No.: US 12,271,131 B2
(45) Date of Patent: Apr. 8, 2025

(54) IMAGE FORMING APPARATUS

(71) Applicant: CANON KABUSHIKI KAISHA, Tokyo (JP)

(72) Inventor: Keisuke Fujita, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/424,702

(22) Filed: Jan. 26, 2024

(65) Prior Publication Data

US 2024/0255871 A1 Aug. 1, 2024

(30) Foreign Application Priority Data

Jan. 31, 2023 (JP) ................................ 2023-012672

(51) Int. Cl.
*G03G 15/20* (2006.01)
*G03G 21/16* (2006.01)
*G03G 21/20* (2006.01)

(52) U.S. Cl.
CPC ..... *G03G 15/2035* (2013.01); *G03G 15/2064* (2013.01); *G03G 21/1619* (2013.01); *G03G 21/1638* (2013.01); *G03G 21/1647* (2013.01); *G03G 21/206* (2013.01); *G03G 21/1633* (2013.01)

(58) Field of Classification Search
CPC ........... G03G 15/2035; G03G 15/2064; G03G 21/1619; G03G 21/1638; G03G 21/1647; G03G 21/206; G03G 21/1633
See application file for complete search history.

(56) References Cited

U.S. PATENT DOCUMENTS

2003/0118382 A1* 6/2003 Tomatsu ............ G03G 15/2064 399/328
2006/0062620 A1* 3/2006 Tanjo ................ G03G 21/1638 399/401
2010/0254728 A1 10/2010 Iwase et al. ........... G03G 15/16
2012/0082478 A1 4/2012 Wang ..................... G03G 15/00
2023/0236538 A1* 7/2023 Kamiya ............. G03G 21/1647 399/122

FOREIGN PATENT DOCUMENTS

JP H08-185076 7/1996
JP 2010-243851 10/2010
JP 2012-093700 5/2012
JP 2020-170031 10/2020

* cited by examiner

*Primary Examiner* — Sandra Brase
(74) *Attorney, Agent, or Firm* — Venable LLP

(57) ABSTRACT

An image forming apparatus includes a casing including a first side plate and a second side plate, a cartridge, an exposure unit, a transfer unit, a fixing unit, a nip pressure change unit, a door, and a connection portion. The first side plate includes an opening portion. The connection portion is arranged so as to penetrate the opening portion, and includes a first portion and a second portion. At least a part of the second portion is arranged so as to overlap with the exposure unit when viewed in a predetermined direction, and is arranged between the first side plate and the exposure unit in the predetermined direction.

15 Claims, 10 Drawing Sheets

IMAGE FORMING APPARATUS

BACKGROUND OF THE INVENTION

Field of the Invention

This disclosure relates to an image forming apparatus that forms an image on a sheet.

Description of the Related Art

According to Japanese Patent Laid-Open No. 2010-243851, an image forming apparatus including a photosensitive drum bearing a toner image, a transfer roller transferring the toner image borne on the photosensitive drum onto a sheet, and a fixing unit fixing the toner image transferred onto the sheet on the sheet is proposed. The fixing unit includes a heating unit incorporating a heating heater, and a pressing roller forming a fixing nip with the heating unit. The heating unit is urged toward the pressing roller by a pressing spring.

Further, in the image forming apparatus, a door that is openable and closable, a contact release mechanism that releases a pressing force of the pressing spring in the fixing nip, and a link mechanism that operates the contact release mechanism in conjunction with an opening movement of the door are disposed. Thereby, it becomes possible to easily remove the sheet that has jammed in the fixing nip.

However, the link mechanism described in Japanese Patent Laid-Open No. 2010-243851 is arranged outside of a side plate of the image forming apparatus. Therefore, the link mechanism becomes a factor that increases the size of the image forming apparatus.

SUMMARY OF THE INVENTION

According to one aspect of the present invention, an image forming apparatus includes a casing including a first side plate and a second side plate, the first side plate and the second side plate being aligned in a predetermined direction, a cartridge including an image bearing member that bears a toner image, the cartridge being attachable in the casing in a position between the first side plate and the second side plate and being detachable from the casing, an exposure unit arranged between the first side plate and the second side plate, the exposure unit being configured to form an electrostatic latent image on the image bearing member by exposing the image bearing member, a transfer unit configured to transfer the toner image borne on the image bearing member onto a sheet, a fixing unit including a heating unit including a heater and a pressing roller configured to form a fixing nip with the heating unit, the fixing unit being configured to fix the toner image transferred onto the sheet on the sheet by applying heat and pressure in the fixing nip, a nip pressure change unit configured to change a nip pressure with which the fixing unit nips the sheet in the fixing nip, a door configured to move to a closed position in which the door is closed with respect to the casing, and an opening position in which the door is opened with respect to the casing, the door being moved from the closed position to the opening position in a case where the cartridge is removed from the casing, and a connection portion configured to connect the door and the nip pressure change unit, the connection portion being configured to operate the nip pressure change unit such that the nip pressure is decreased in a case where the door moves from the closed position to the opening position. The first side plate includes an opening portion. The connection portion is arranged so as to penetrate the opening portion, and includes a first portion arranged on an opposite side of the second side plate with respect to the first side plate in the predetermined direction, and a second portion arranged on a same side as the second side plate with respect to the first side plate in the predetermined direction. At least a part of the second portion is arranged so as to overlap with the exposure unit when viewed in the predetermined direction, and is arranged between the first side plate and the exposure unit in the predetermined direction.

Further features of the present invention will become apparent from the following description of exemplary embodiments with reference to the attached drawings.

DESCRIPTION OF THE EMBODIMENTS

First Embodiment

Overall Configuration

Figure 1:
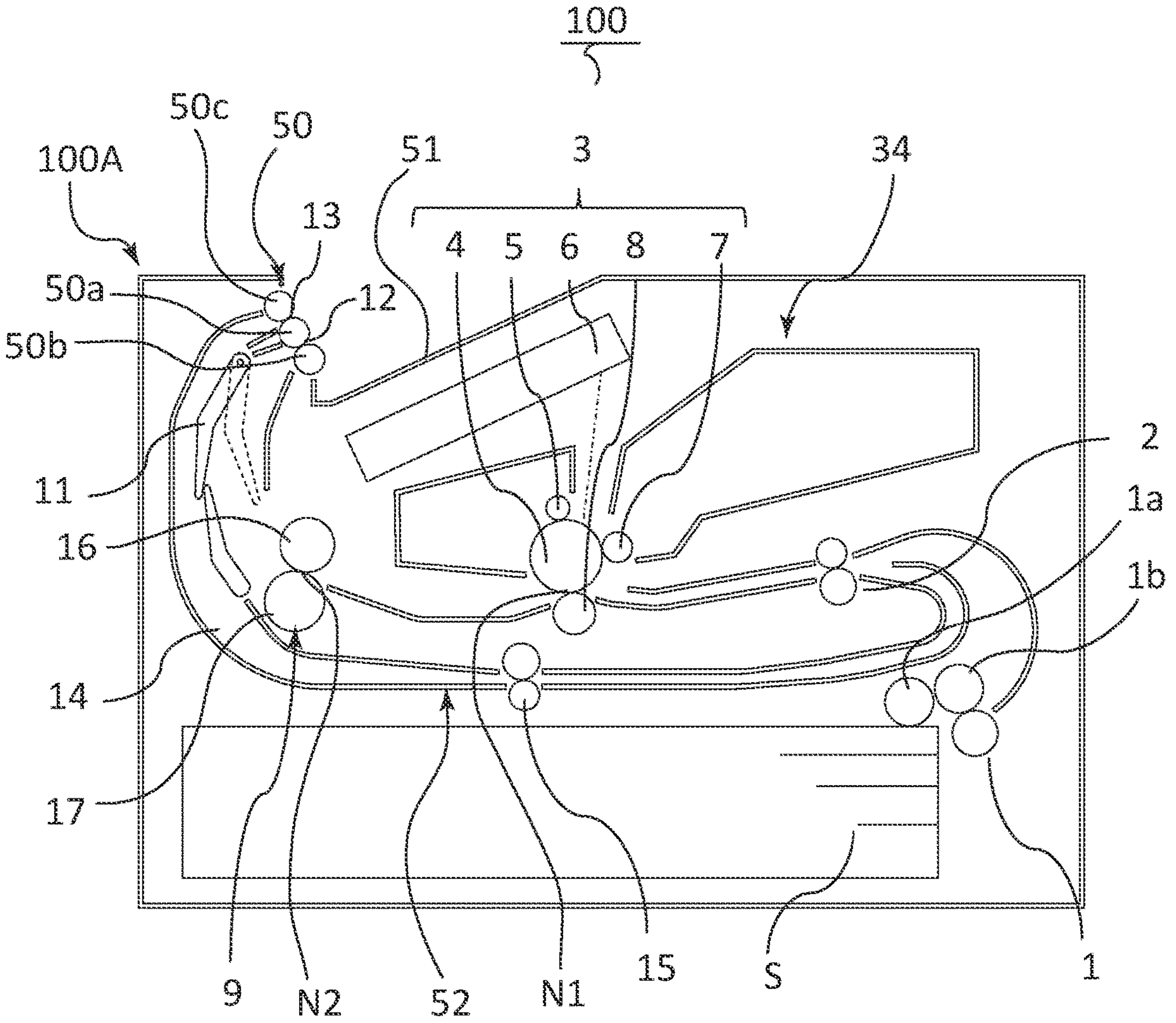
FIG. 1 is an overall schematic diagram illustrating a printer of a first embodiment.

First, a first embodiment of this disclosure will be described. A printer 100, serving as an image forming apparatus of the first embodiment, is a laser beam printer of an electrophotographic system. As illustrated in FIG. 1, the printer 100 includes a feed unit 1 feeding a sheet S and an image forming unit 3 forming an image on the sheet S. Further, the printer 100 includes a fixing unit 9 fixing the image of the sheet, a sheet discharge triple rollers 50 discharging the sheet to a sheet discharge tray 51, and a duplex conveyance portion 52 for forming the image on both surfaces of the sheet.

The image forming unit 3 includes a laser unit 6, a photosensitive drum 4, serving as an image bearing member, a charge roller 5, a developing roller 7, and a transfer roller 8, serving as a transfer unit. The photosensitive drum 4, the charge roller 5, the developing roller 7, and the like are put into a cartridge, serving as a cartridge 34. The cartridge 34 is detachable with respect to a printer body 100A.

When an instruction of image formation is output to the printer 100, based on image information input from such as an external computer connected to the printer 100, an image forming process by the image forming unit 3 is started. The laser unit 6, serving as an exposure unit, emits a laser beam toward the photosensitive drum 4 based on the image information that has been input. At this time, the photosensitive drum 4 has been charged beforehand by the charge roller 6, and, by being irradiated with the laser beam, an electrostatic latent image is formed on the photosensitive drum 4. Thereafter, this electrostatic latent image is developed by the developing roller 7, and a toner image is formed on the photosensitive drum 4.

In parallel with the image forming operation described above, the sheet S stacked in a lower part of the printer 100 is fed by the feed unit 1. For example, the sheet S is stacked in a cassette that is drawable and attachable with respect to the printer body 100A. The sheet S includes paper such as a paper sheet and an envelope, a plastic film such as a sheet for an overhead projector (OHP), cloth, and the like.

The feed unit 1 includes a feed roller 1*a* feeding the sheet S, and a separation roller pair 1*b* separating the sheet S fed by the feed roller 1*a* into one sheet at a time. The sheet S fed by the feed unit 1 is conveyed to a registration roller pair 2. The registration roller pair 2 corrects skew by forming a loop in the sheet S, and, at a predetermined conveyance timing, conveys the sheet S toward a transfer nip N1 formed by the photosensitive drum 4 and the transfer roller 8. A transfer bias is applied from the transfer roller 8 in the transfer nip N1, and the toner image formed on the photosensitive drum 4 is transferred onto the sheet S.

Further, when heat and pressure are applied to the sheet S, which has passed through the transfer nip N1, by a fixing nip N2 of the fixing unit 9, the toner image is fixed, and the sheet S is conveyed toward the sheet discharge triple rollers 50. The sheet discharge triple rollers 50 includes a sheet discharge drive roller 50*a*, a sheet discharge driven roller 50*b*, and a reverse driven roller 50*c*. The sheet discharge drive roller 50*a* is driven by a motor, not shown, and the sheet discharge driven roller 50*b* and the reverse driven roller 50*c* are rotatably driven by the sheet discharge drive roller 50*a*. The sheet discharge drive and driven rollers 50*a* and 50*b* form a sheet discharge nip 12, and the sheet discharge drive roller 50*a* and the reverse driven roller 50*c* form an inversion nip 13.

In a case of single-sided printing to form the image on one side of the sheet S, the sheet S conveyed by the fixing unit 9 is guided toward the sheet discharge nip 12 by a guide member 11. To be noted, the guide member 11 is movable between positions shown by a solid line and a dashed line in FIG. 1 at any timing by an actuator. Then, the sheet S is discharged onto the sheet discharge tray 51 by the sheet discharge nip 12.

In a case of duplex printing to form the image on both surfaces of the sheet S, the sheet S on whose first surface the image has been formed is guided to the inversion nip 13 by the guide member 11. The sheet discharge drive roller 50*a* reverses rotation after a trailing edge of the sheet S has passed through the guide member 11. Thereby, the sheet S is switchbacked by the inversion nip 13, and is conveyed toward the duplex conveyance portion 52. The sheet S conveyed by the duplex conveyance portion 52 is guided so as to pass below the fixing unit 9 by an inversion guide 14, and is conveyed again to the registration roller pair 2 by a conveyance roller pair 15.

To be noted, the conveyance roller pair 15 is capable of switching between drive and stop modes using a mechanism, not shown. When the other sheet is present in the registration roller pair 2, the conveyance roller pair 15 is stopped, and, after the other sheet has passed through the registration roller pair 2, the conveyance roller pair 15 is driven. Then, the image is formed on a second surface of the sheet S in the transfer nip N1, and the sheet S is discharged to the sheet discharge tray 51 by the sheet discharge nip 12.

Fixing Unit

Figure 2:
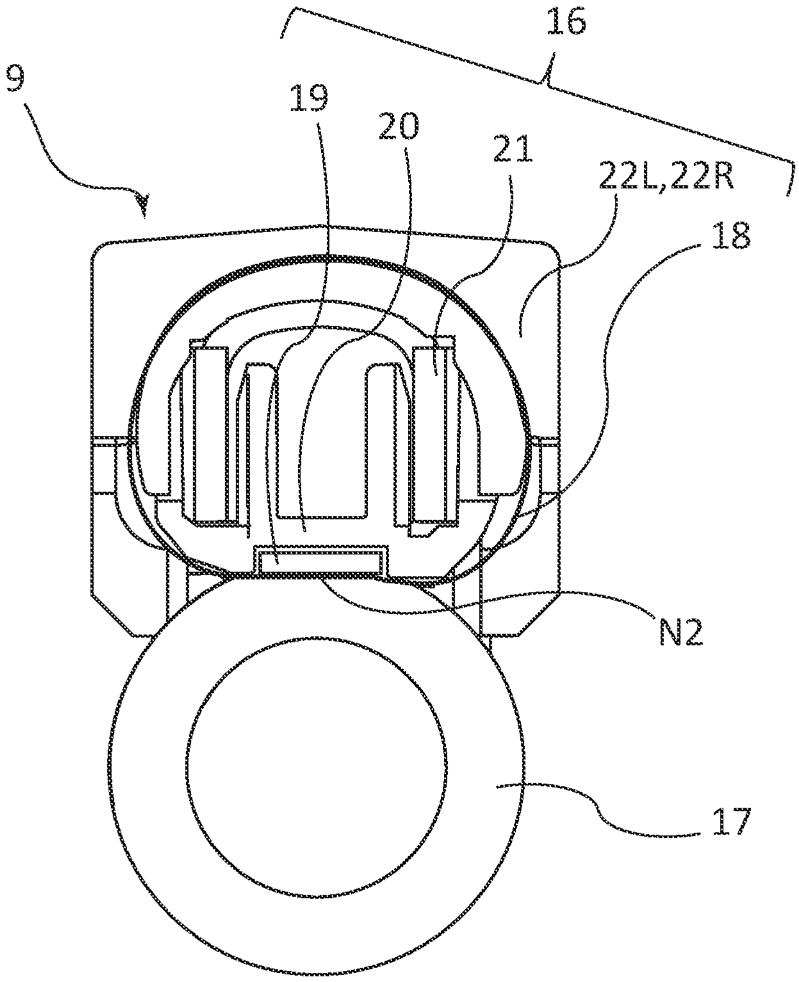
FIG. 2 is a cross-sectional view illustrating a fixing unit.

Next, using FIG. 2, a configuration of the fixing unit 9 will be described in detail. As illustrated in FIG. 2, the fixing unit 9 includes a heating unit 16, serving as a heating unit, and a pressing roller 17. The heating unit 16 includes a film 18, a heater 19, a film guide member 20, and a stay member 21, flange members 22L and 22R. The film 18 is flexible and rotatable, and is formed in a cylindrical shape. The film 18, the heater 19, the film guide member 20, the stay member 21, and the pressing roller 17 are members that are elongated in a width direction W (refer to FIG. 3A) perpendicular to a conveyance direction of the sheet S. The width direction W is a direction along a rotational axis of the photosensitive drum 4 (refer to FIG. 1).

An inner circumferential surface of the film 18 is supported by the film guide member 20, and the film guide member 20 supports the heater 19. The stay member 21 reinforces the film guide member 20 by holding the film guide member 20, and the flange members 22L and 22R are secured to either end portion of the stay member 21 in the width direction W, serving as a predetermined direction. When the pressing roller 17 is driven by a drive source, not shown, the film 18 is rotatably driven with respect to the pressing roller 17.

When the flange members 22L and 22R are pressed by a nip pressure change unit, described below, a pressing force acting on the flange members 22L and 22R is transmitted from the flange members 22L and 22R to the film 18 via the stay member 21, the film guide member 20, and the heater 19. Thereby, the fixing nip N2 is formed between the heating unit 16, incorporating the film 18, and the pressing roller 17, and the sheet S is conveyed while being nipped in the fixing nip N2. At this time, predetermined nip pressure and the heat are applied to the toner image on the sheet S, and it is possible to fix the toner image on the sheet S.

Nip Pressure Change Unit

Figure 3A:
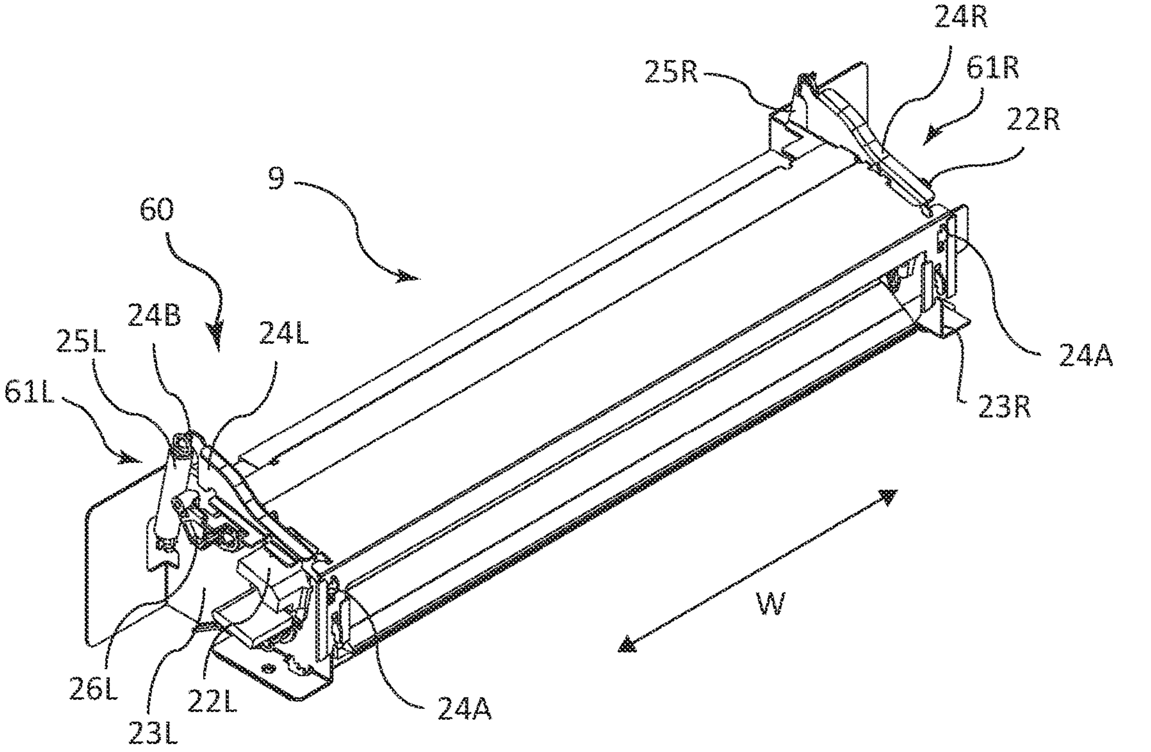
FIG. 3A is a perspective view illustrating the fixing unit and a nip pressure change unit.

Next, using FIGS. 3A to 4, the nip pressure change unit 60 will be described. As illustrated in FIG. 3A, the nip pressure change unit 60 includes a first nip pressure change unit 61L arranged on a first side with respect to the fixing unit 9 in the width direction W, and a second nip pressure change unit 61R arranged on a second side with respect to the fixing unit 9 in the width direction W.

Figure 3B:
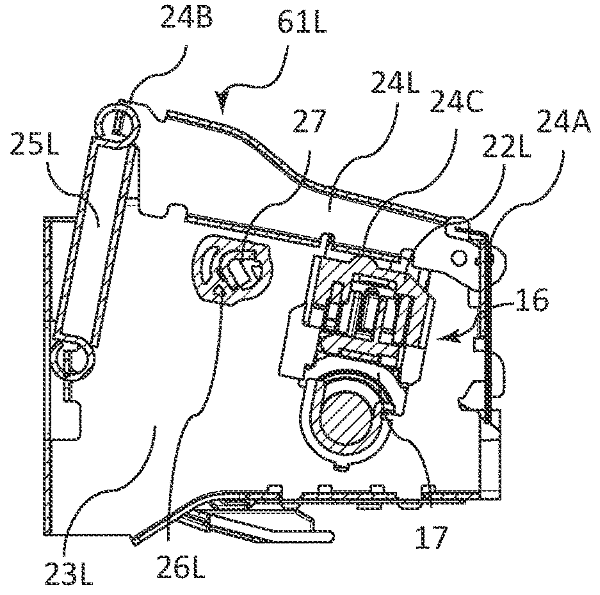
FIG. 3B is a cross-sectional view illustrating a first nip pressure change unit in a state in which a cam is positioned in a separation position.
Figure 3C:
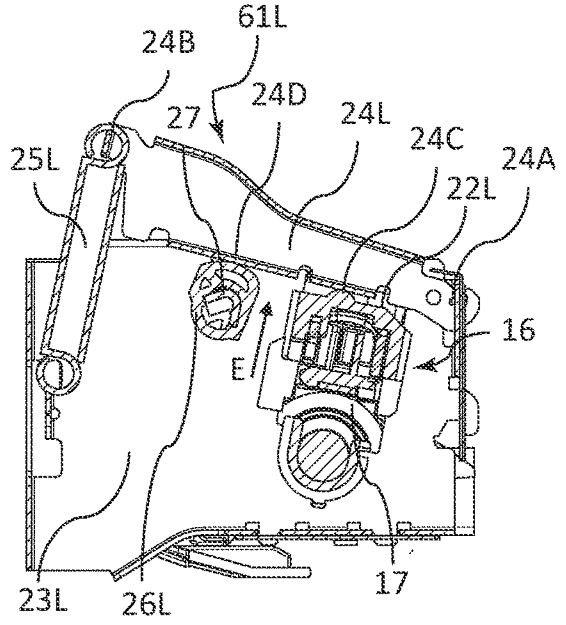
FIG. 3C is a cross-sectional view illustrating the first nip pressure change unit in a state in which the cam is positioned in a contact position.

The fixing unit 9 includes a pair of fixing side plates 23L and 23R disposed in parallel in the width direction W. As illustrated in FIGS. 3A to 3C, the first nip pressure change unit 61L includes a pressure plate 24L, a tension spring 25L, and a cam 26L. The pressure plate 24L is pivotably supported by the fixing side plate 23L with a pivoting point 24A as a center, and the tension spring 25 is disposed in a manner stretching between the fixing side plate 23L and the pressure plate 24L.

That is, in the pressure plate 24L, the pivoting point 24A is arranged at a first end, and a receiving point 24B receiving a force from the tension spring 25L is arranged at a second end. Then, the pressure plate 24L presses the flange member 22L by an urging force of the tension spring 25L at a working point 24C between the pivoting point 24A and the receiving point 24B. In other words, the urging force of the tension spring 25L is transmitted to the flange member 22L using the principle of leverage via the pressure plate 24L. Thereby, the one side in the width direction W of the heating unit 16 including the flange member 22L is urged toward the pressing roller 17.

Further, the cam 26L is rotatably secured with respect to the fixing side plate 23L. The cam 26L can stop in at least two phases: a separation position illustrated in FIG. 3B and a contact position illustrated in FIG. 3C. The cam 26L is separated from the pressure plate 24L in the separation position. Therefore, when the cam 26L is positioned in the separation position, as described above, the pressing roller 17 is pressed by the heating unit 16.

On the other hand, in the contact position, the cam 26 comes into contact with the pressure plate 24L at a contact point 24D. At this time, the pressure plate 24L is pushed upward from a position illustrated in FIG. 3B by the cam 26L, while resisting the urging force of the tension spring 25L. Further, by a reaction force of the pressing roller 17, the flange member 22L moves in an arrow E direction illustrated in FIG. 3C, namely, in a direction apart from the pressing roller 17, until the flange member 22L comes into contact with the pressure plate 24L. Thereby, the pressing force onto the pressing roller 17 by the heating unit 16 is reduced, and the nip pressure in the fixing nip N2 decreases.

Incidentally, as with the first nip pressure change unit 61L, the second nip pressure change unit 61R includes a pressure plate 24R, a tension spring 25R, and a cam 26R (refer to FIG. 4), and has a function similar to the first nip pressure change unit 61L. That is, when the cam 26R is positioned in the separation position, the other side in the width direction W of the heating unit 16 including the flange member 22R is urged toward the pressing roller 17 by the tension spring 25R and the pressure plate 24R. Further, when the cam 26R is positioned in the contact position, the pressing force onto the pressing roller 17 by the heating unit 16 is reduced, and the nip pressure in the fixing nip N2 decreases.

Figure 4:
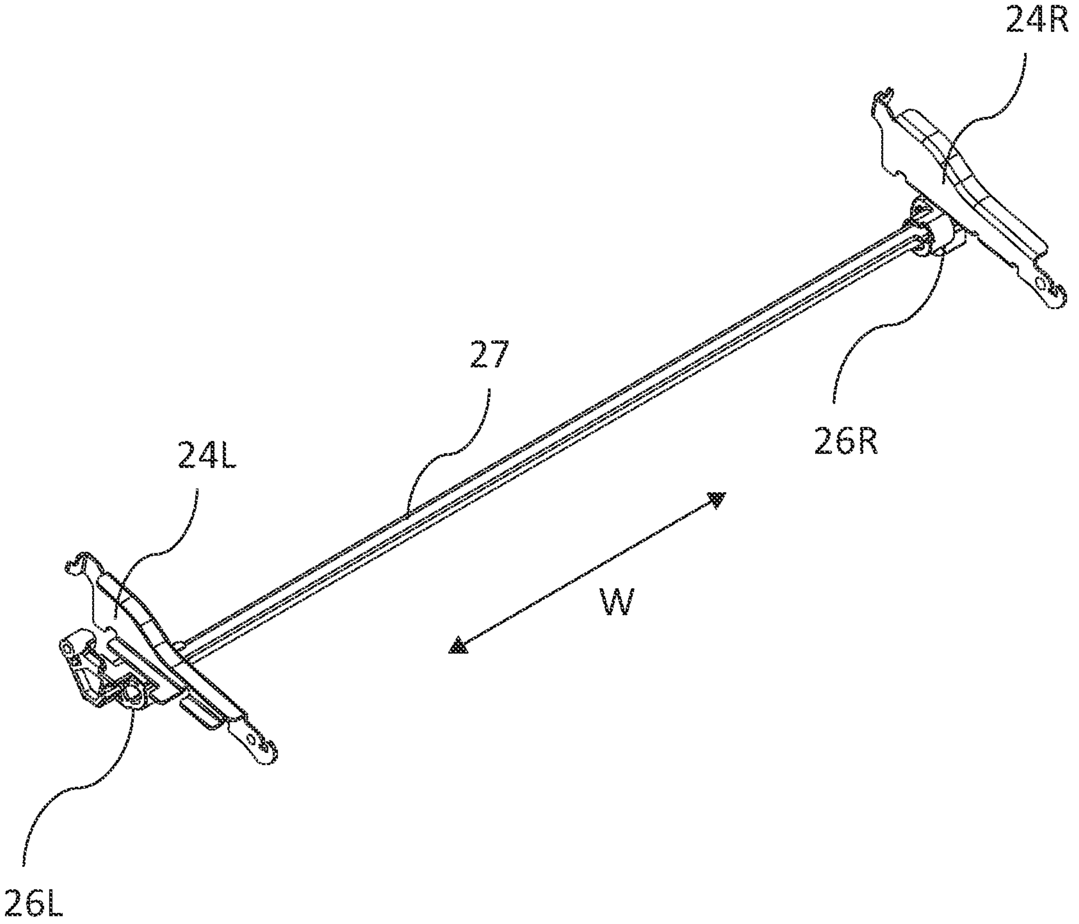
FIG. 4 is a perspective view illustrating the cam and a camshaft.

As illustrated in FIG. 4, the cam 26L, serving as a first cam of the first nip pressure change unit 61L, and the cam 26R, serving as a second cam of the second nip pressure change unit 61R are connected by the camshaft 27 such that the phases of the cams 26L and 26R are aligned with each other. The camshaft 27 extends in parallel to the width direction W. Therefore, by rotating any of the cam 26L, the cam 26R, and the camshaft 27 by an actuator, not shown, it is possible to simultaneously operate the first and second nip pressure change units 61L and 61R.

Arrangement of Camshaft

Figure 5A:
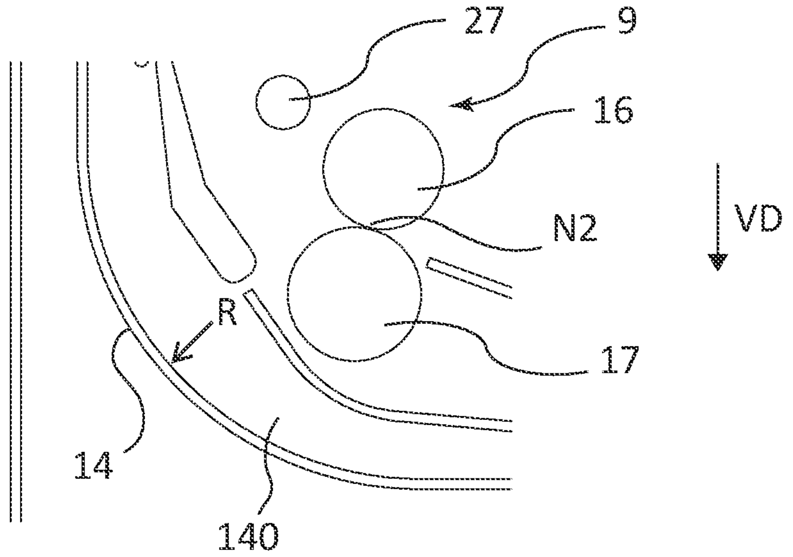
FIG. 5A is a diagram illustrating the arrangement of the camshaft of the first embodiment.
Figure 5B:
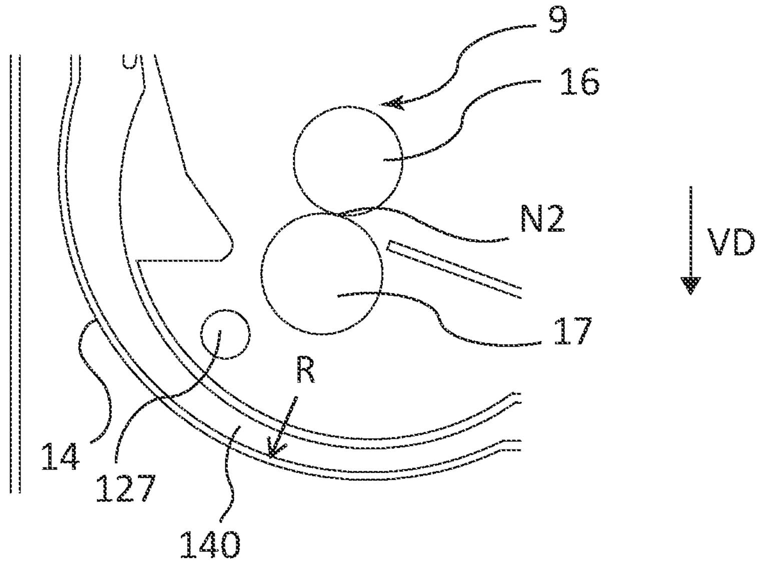
FIG. 5B is a diagram illustrating the arrangement of a camshaft of a variant example.

Next, using FIGS. 5A and 5B, the arrangement of the camshaft 27 will be described. FIG. 5A is a diagram illustrating the arrangement of the camshaft 27 of the present embodiment, and FIG. 5B is a diagram illustrating the arrangement of a camshaft 127 of a variant example. As illustrated in FIG. 5B, the camshaft 127 of the variant example is arranged below the fixing nip N2 of the fixing unit 9 in the vertical direction VD. In other words, the camshaft 127 is arranged on the same side as the pressing roller 17 with respect to a conveyance path through which the sheet S conveyed by the fixing nip N2 passes. Since a duplex conveyance path 140 formed by the inversion guide 14 is disposed by avoiding the camshaft 127, the duplex conveyance path 140 is arranged further below the camshaft 127. Therefore, the printer body is enlarged.

On the other hand, as illustrated in FIG. 5A, the camshaft 27 of the present embodiment is arranged above the fixing nip N2 of the fixing unit 9 in the vertical direction VD. In other words, the camshaft 27 is arranged on the same side as the heating unit 16 with respect to the conveyance path through which the sheet S conveyed by the fixing nip N2 passes. Therefore, it is possible to arrange the duplex conveyance path 140, formed by the inversion guide 14, closer to the fixing unit 9 than the variant example illustrated in FIG. 5B.

Therefore, in a case where the curvature R of the duplex conveyance path 140 in FIGS. 5A and 5B is the same, in comparison with the variant example illustrated in FIG. 5B, the present embodiment illustrated in FIG. 5A can reduce the size of the printer body 100A. Further, in a case where the size of the printer body 100A is not reduced, since it is possible to increase the curvature R of the duplex conveyance path 140, it is possible to stably convey the sheet S by reducing conveyance resistance between the sheet S and the inversion guide 14.

Configurations of Door and Link Member

Figure 6A:
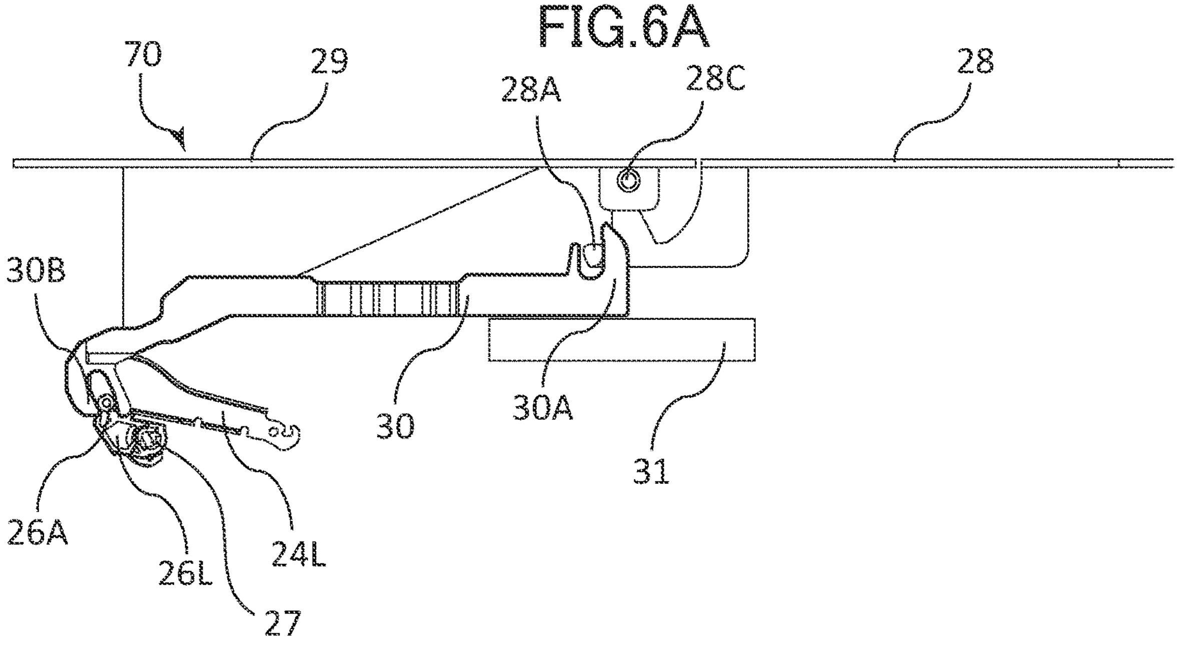
FIG. 6A is a side view illustrating an adjacent configuration of a link member when the door is situated in a closed position.
Figure 6B:
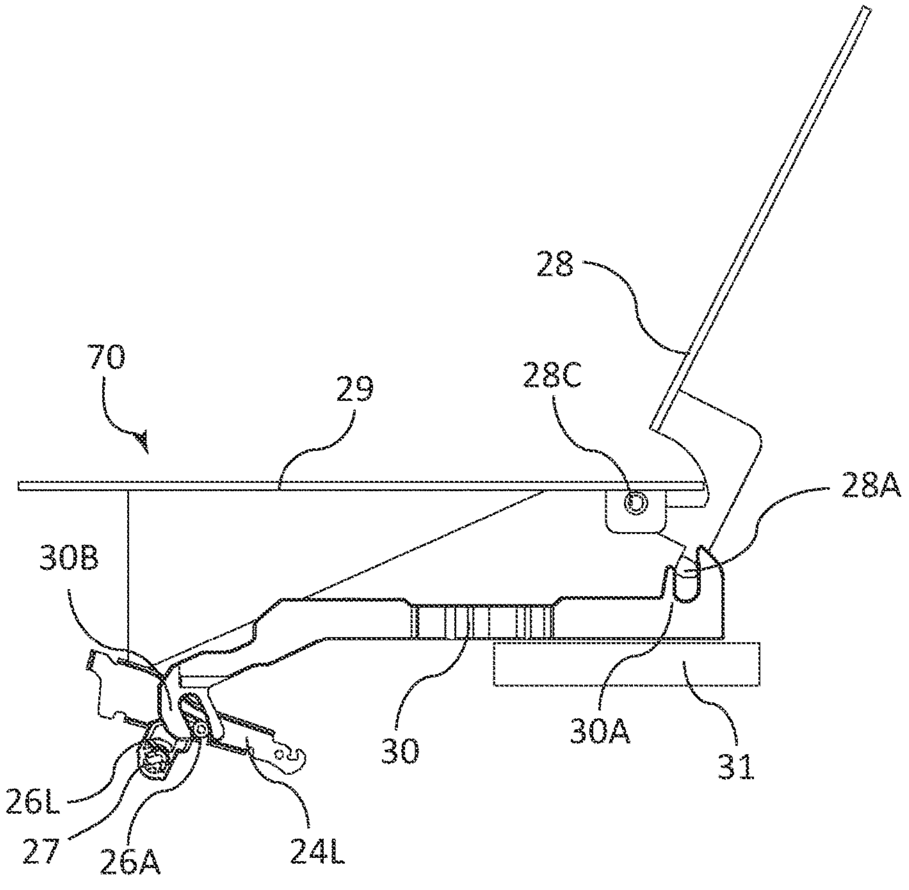
FIG. 6B is a side view illustrating the adjacent configuration of the link member when the door is situated in an opening position.
Figure 7A:
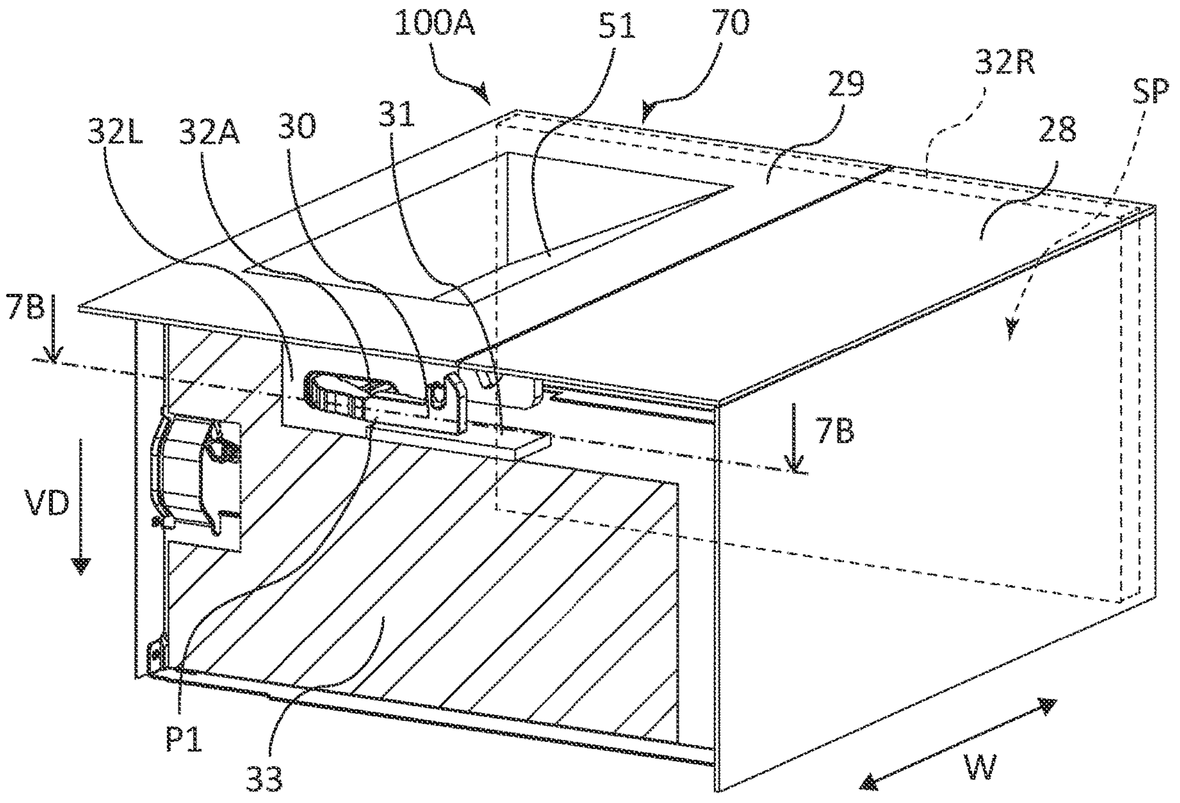
FIG. 7A is a perspective view illustrating the adjacent configuration of the link member.
Figure 7B:
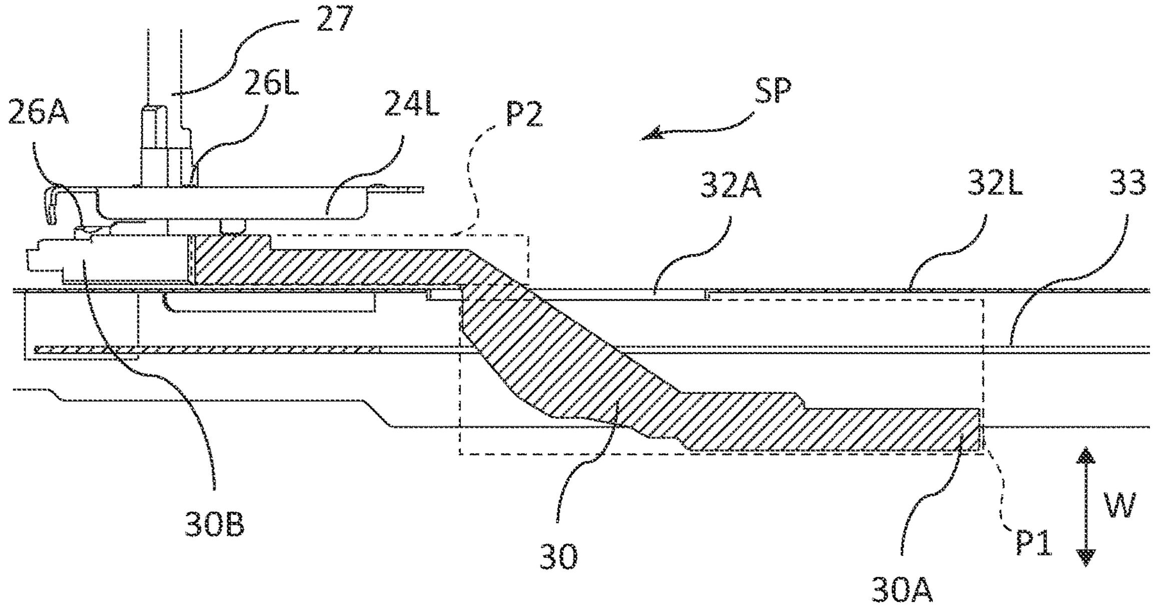
FIG. 7B is a cross-sectional view illustrating a cross section taken along the plane 7B-7B of FIG. 7A.

Next, configurations of a door 28 disposed on the printer body 100A, and a link member 30, serving as a connection portion, will be described using FIGS. 6A to 7B. FIG. 6A is a side view illustrating an adjacent configuration of the link member 30 when the door 28 is situated in a closed position, and FIG. 6B is a side view illustrating the adjacent configuration of the link member 30 when the door 28 is situated in an opening position. FIG. 7A is a perspective view illustrating the adjacent configuration of the link member 30, and FIG. 7B is a cross-sectional view illustrating a cross section taken along the plane 7B-7B of FIG. 7A.

As illustrated in FIG. 7A, the printer body 100A includes a casing 70 incorporating such as the left side plate 32L and a right side plate 32R arranged alongside in the width direction W, and a top cover 29, and further includes the door 28 supported in an openable and closable manner with respect to the top cover 29 of the casing 70. To be noted, the left side plate 32L is a first side plate according to the present embodiment, and the right side plate 32R is a second side plate according to the present embodiment. The left and right side plates 32L and 32R extend along a plane perpendicular to the width direction W. The door 28 is disposed in the front direction of the top cover 29. Hereinafter, a downstream side in the conveyance direction of the sheet discharged by the sheet discharge nip 12 is referred to as the front side, and the width direction W is assumed to be parallel to a left-right direction of the printer 100. A space SP is disposed between the left and right side plates 32L and 32R of the casing 70, and the cartridge 34 (refer to FIG. 1) is arranged in the space SP.

As illustrated in FIG. 6A, the door 28 is supported in the openable and closable manner with respect to the top cover 29 with a rotation shaft 28C as a center, and movable to the closed position illustrated in FIG. 6A and the opening position illustrated in FIG. 6B. The door 28 is closed with respect to the casing 70 in the closed position, and opened with respect to the casing 70 in the opening position. To be noted, when the door 28 is situated in the closed position, the cam 26L is positioned in the separation position, and, when the door 28 is situated in the opening position, the cam 26L is positioned in the contact position. When the cartridge 34 (refer to FIG. 1) is removed from the casing 70 and when jam processing inside of the printer body 100A is performed, the door 28 is moved from the closed position to the opening position.

As illustrated in FIGS. 6A and 6B, when viewed in the width direction W, a shaft portion 28A is disposed in the door 28 in a position different from the rotation shaft 28C, and a shaft portion 26A is disposed in the cam 26L in a position different from the camshaft 27. The shaft portion 28A of the door 28 and the shaft portion 26A of the cam 26L are connected by the link member 30. More particularly, the link member 30 includes a hook portion 30A at a first end portion and a hook portion 30B at a second end portion. Then, the hook portion 30A is rotatably connected to the shaft portion 28A, and the hook portion 30B is rotatably connected to the shaft portion 26A.

When the door moves from the closed position to the opening position, the shaft portion moves in the front direction, and, in conjunction with this, the link member 30 that is connected to the shaft portion 28A by the hook portion 30A also moves in the front direction by being guided by a guide member 31. To be noted, when the door 28 moves from the closed position to the opening position, the shaft portion 28A moves along the horizontal direction. In other words, when the door 28 moves between the closed position and the opening position, the shaft portion 28A moves in the front-back direction (horizontal direction) across the rotation shaft 28C, and a movement in the vertical direction is small. Then, the movement of the shaft portion 28A in the vertical direction is absorbed by a notch portion disposed on the hook portion 30A of the link member 30. Therefore, the shaft portion 28A, serving as an engaged portion. can directly engage with respect to the link member 30 that moves in the horizontal direction in conjunction with the shaft portion 28A, and other members do not intercede between the shaft portion 28A and the hook portion 30A of the link member 30, so that it is possible to reduce the number of components. The guide member 31 is secured to the left side plate 32L. Then, when the link member 30 moves in the front direction, the cam 26L that is connected to the hook portion 30B by the shaft portion 26A rotates with the camshaft 27 as a center. Thereby, the cam 26L moves from the separation position to the contact position.

On the contrary, in a case where the door 28 moves from the opening position to the closed position, the link member 30 moves to the back, and the cam 26L moves from the contact position to the separation position. To be noted, since the cams 26L and 26R are connected by the camshaft 27, the cam 26R also moves between the contact position and the separation position. integrally with the cam 26L.

As described above, in conjunction with the opening and closing operation of the door 28, the cams 26L and 26R rotate via the link member 30. Thereby, by the function of the nip pressure change unit 60 described above, nip pressure in the fixing nip N2 changes. In particular, when the door is opened with respect to the casing 70, the nip pressure in the fixing nip N2 decreases, and, when the door 28 is closed with respect to the casing 70, the nip pressure in the fixing nip N2 increases.

Jam Processing

Figure 8A:
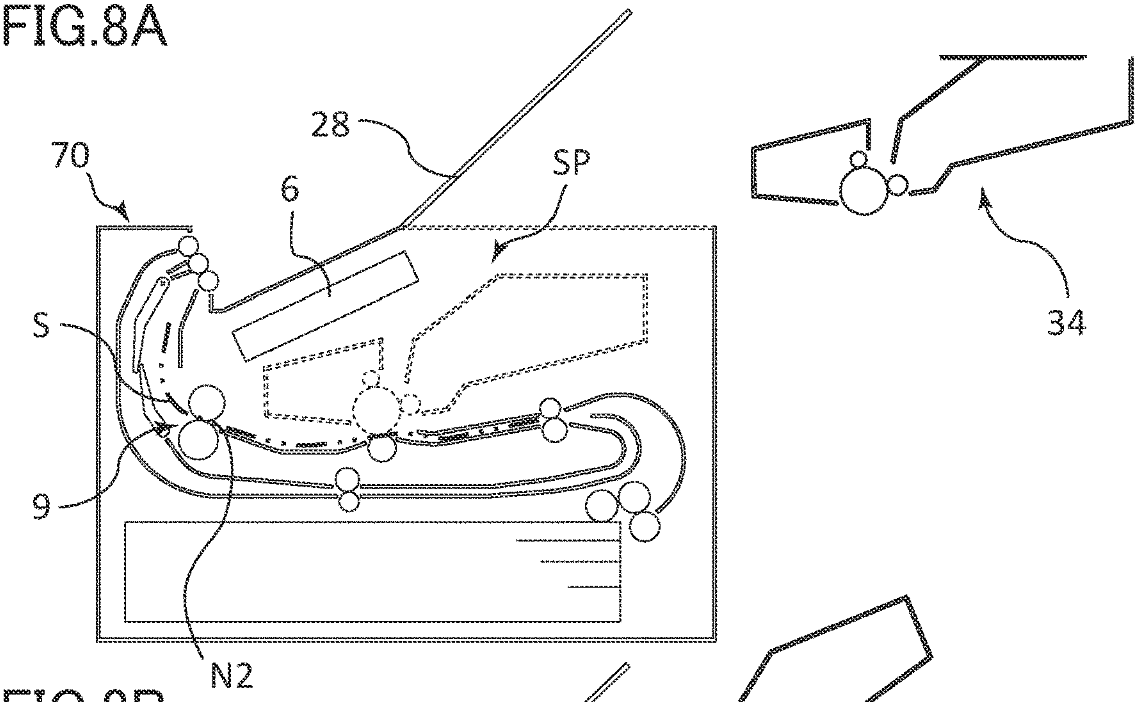
FIG. 8A is a diagram for explaining jam processing.
Figure 8B:
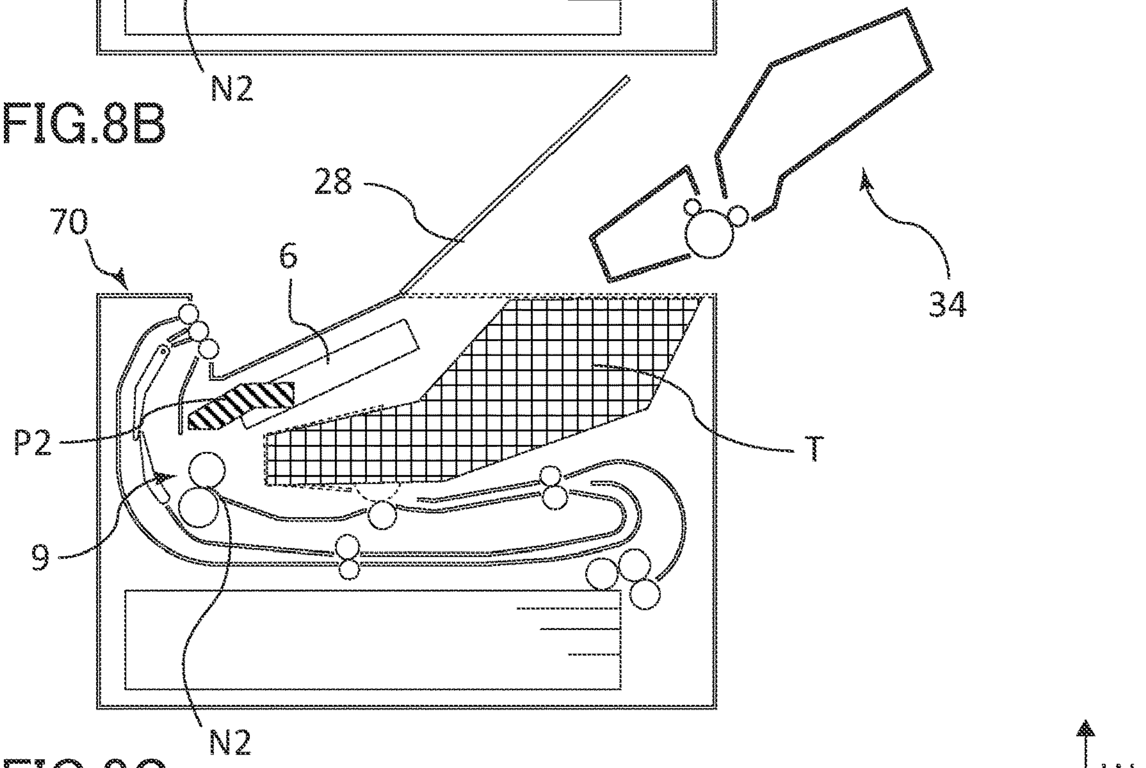
FIG. 8B is a cross-sectional view illustrating a movement locus of a cartridge.
Figure 8C:
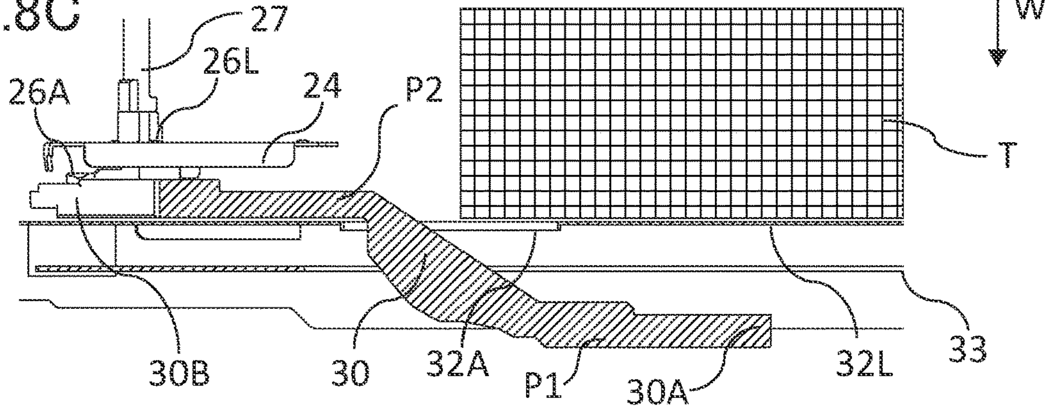
FIG. 8C is a cross-sectional view illustrating a positional relationship between the link member and the movement locus.

Next, using FIG. 8A, the jam processing to remove the sheet S remained in the fixing nip N2 will be descried. First, as illustrated in FIG. 8C, a user opens the door 28. At this time, in conjunction with the opening operation of the door 28, the nip pressure in the fixing nip N2 is decreased by the link member 30 and the nip pressure change unit 60 described above.

Then, the user removes the cartridge 34 located in the space SP inside of the casing 70, and eliminates the sheet S that has jammed. Since the cams 26L and 26R are positioned in the separation position during the operation of the printer 100, the nip pressure in the fixing nip N2 is large. This is because the predetermined nip pressure is necessary for fixing the toner image on the sheet S. However, if the nip pressure in the fixing nip N2 is in an elevated state, the user is required to pull the sheet S with a large force when performing the jam processing of the sheet S from the fixing nip N2, so that usability decreases. Further, in some cases, the sheet S may tear.

However, as with the present embodiment, by decreasing the nip pressure in the fixing nip N2 in conjunction with the door 28 that is opened at the time of performing the jam processing, the user can remove the sheet S from the fixing nip N2 with a small force, and can easily perform the jam processing. After having removed the sheet S from the casing 70, the user attaches the cartridge 34 in the casing 70, and closes the door 28. Thereby, the nip pressure in the fixing nip N2 returns to an original pressure, and the fixing unit 9 becomes ready for printing.

Arrangement of Link Member

Next, using FIGS. 7A and 7B and FIGS. 8B and 8C, the arrangement of the link member 30 will be described in detail. FIG. 8B is a cross-sectional view illustrating a movement locus T of the cartridge 34, and FIG. 8C is a cross-sectional view illustrating a positional relationship between the link member 30 and the movement locus T. To be noted, FIG. 8C is a cross-sectional view illustrating a cross section taken along the plane 7B-7B of FIG. 7A. To be noted, FIGS. 7A and 7B illustrate the view with an exterior cover of a side surface of the casing 70 disassembled.

As illustrated in FIGS. 7A and 7B, a through hole 32A, serving as an opening portion penetrating in the width direction W, is disposed in the left side plate 32L. The through hole 32A is arranged above the photosensitive drum 4 (refer to FIG. 1) in the vertical direction VD. The link member 30 is arranged to penetrate the through hole 32A. For this purpose, the link member 30 includes a first portion P1 arranged on an opposite side of the right side plate 32R with respect to the left side plate 32L in the width direction W, and a second potion P2 disposed on the same side as the right side plate 32R with respect to the left side plate 32L in the width direction W. The first portion P1 includes the hook portion 30A, serving as a first engagement portion that engages with the shaft portion 28A of the door 28, and the second portion P2 includes the hook portion 30B, serving as a second engagement portion that engages with the shaft portion 26A of the cam 26L. To be noted, while the link member 30 moves in the front-back direction in conjunction with the opening and closing of the door 28, the through hole 32*a* includes play so as to allow the link member 30 to move in the front-back direction.

As illustrated in FIGS. 8A and 8B, in the casing 70, the laser unit 6 is arranged inside of the through hole 32A in the width direction W. Here, a width of the laser unit 6 is smaller than a width of the cartridge 34 in the width direction W. The cartridge 34 is positioned in a attaching position by, for example, engaging with the left and right side plates 32L and 32R. That is, the width of the cartridge 34 is substantially the same as a distance between the left and right side plates 32L and 32R. Then, there is a space between the laser unit 6 and the left side plate 32L in the width direction W, and the second portion P2 of the link member 30 is arranged in this space. In other words, at least a part of the second portion P2 is arranged to overlap with the laser unit 6 when viewed in the width direction W, and is positioned between the left side plate 32L and the laser unit 6 in the width direction W.

To be noted, while the link member 30 is configured to penetrate the through hole 32 substantially in a central portion in the front-back direction, it is not limited to this. For example, the link member 30 may penetrate the through hole 32A in a position near the hook portion 30A, or may penetrate the through hole 32A in a position near the hook portion 30B.

Further, as illustrated in FIG. 8C, the second portion P2 is arranged so as not to interfere with the movement locus T of the cartridge 34 when the cartridge 34 is attached and detached with respect to the casing 70. To be noted, since the first portion P1 is disposed outside of the left side plate 32L, the first portion P1 does not interfere with the cartridge 34. By arranging the laser unit 6, the second portion P2 of the link member 30, and the movement locus T as described above, it is possible to arrange each member compactly, and possible to miniaturize the printer 100.

Further, since the second portion P2 of the link member 30 is arranged further inside of the casing 70 than the left side plate 32L in the width direction, an available space is created on the outside of the left side plate 32L (opposite side of the right side plate 32R) in the width direction. On the outside of the left side plate 32L in the width direction W, as illustrated in FIG. 7A, an electric board 33 is arranged, and the electric board 33, serving as a board, extends to a position that, when viewed in the width direction, overlaps with the second portion P2. Thereby, an area of the electric board 33 can be largely secured. Further, the electric board 33 is arranged so as not to interfere with the first portion P1 of the link member 30. The electric board 33 includes, for example, a central processing unit (CPU) that controls the image forming unit 3.

As described above, in the present embodiment, the link member 30 is arrange in a manner penetrating the through hole 32A disposed in the left side plate 32L. Thereby, while incorporating the configuration by which the nip pressure in the fixing nip N2 is changed in conjunction with the door 28, it is possible to miniaturize the printer 100.

Variant Example

Figure 9A:
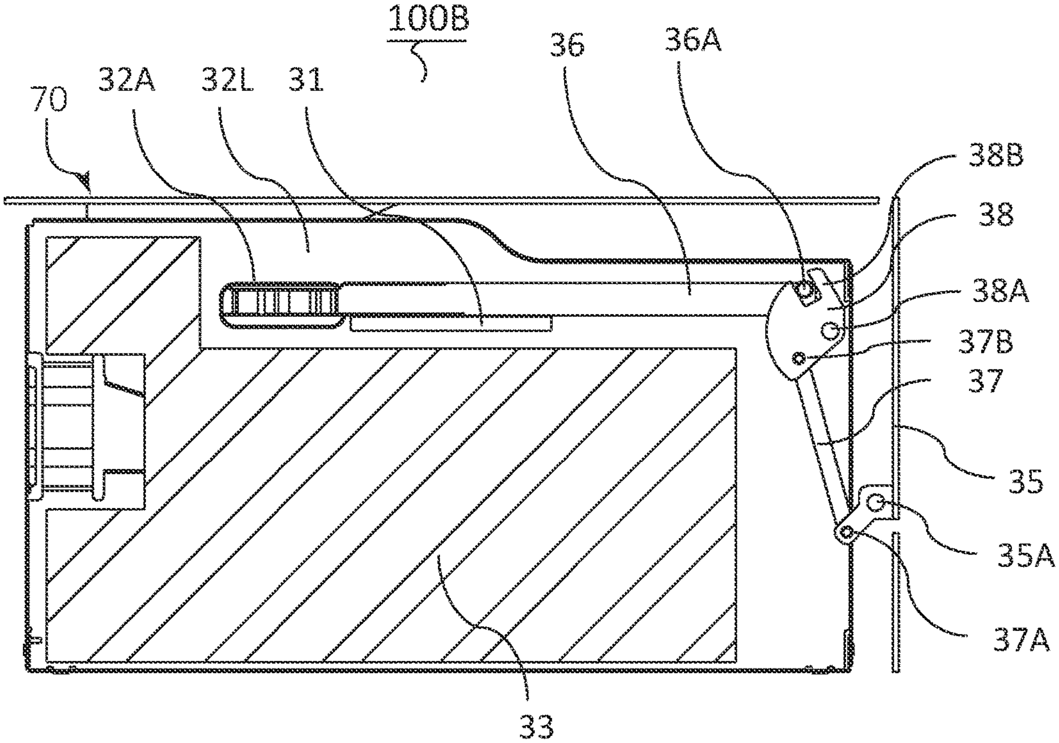
FIG. 9A is a cross-sectional view illustrating a printer of the variant example in a state in which the door is closed.
Figure 9B:
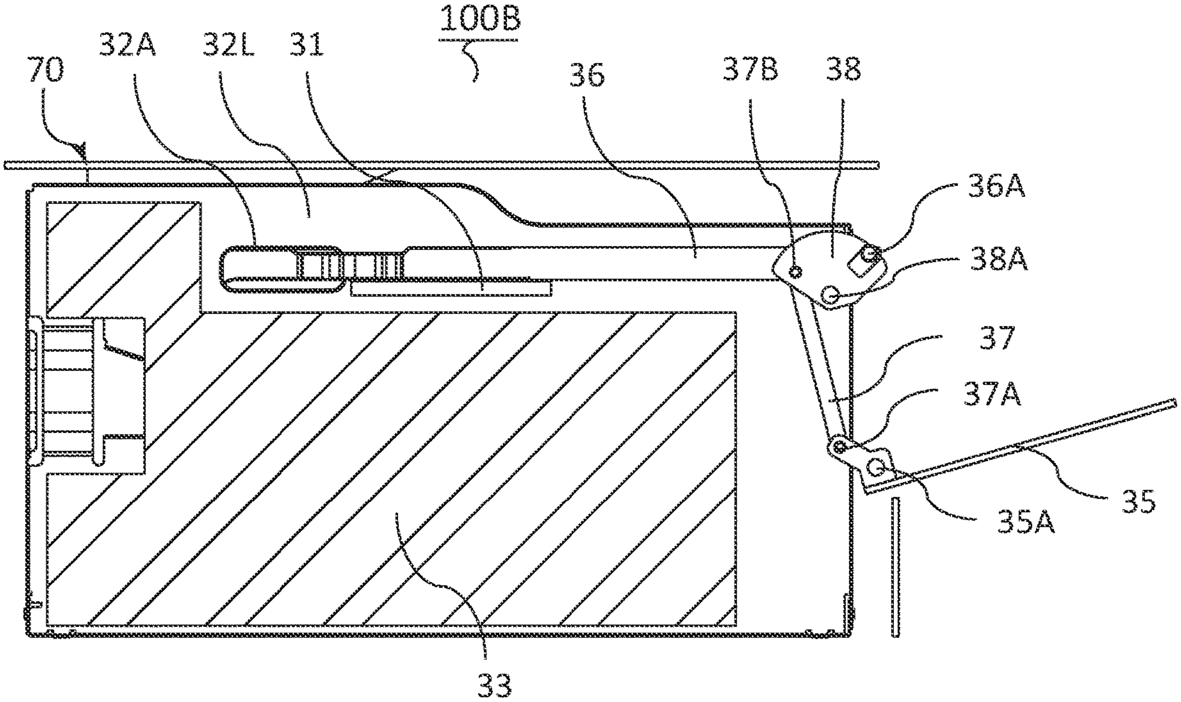
FIG. 9B is a cross-sectional view illustrating the printer in a state in which the door is opened.

Next, using FIGS. 9A and 9B, a variant example of the first embodiment will be described. FIG. 9A is a cross-sectional view illustrating a printer 100B that is in a state in which a door 35 is closed, and FIG. 9B is a cross-sectional view illustrating the printer 100B that is in a state in which the door 35 is opened.

In the first embodiment described above, in the closed position, the door 28 constitutes a part of a top surface of the casing 70. On the other hand, the door 35 of the variant example constitutes a part of a side surface of the casing 70 in the closed position. Further, the door 35 is pivotable in the front-back direction with a pivot shaft 35A as a center.

The door 35 is rotatably connected to a connection link 37 via a link shaft 37A. Further, the connection link 37 is rotatably connected to a pivot link 38 via the link shaft 37B. The pivot link 38 includes a groove portion 38B that engages with a shaft portion 36A disposed in a link member 36, serving as a connection portion, and is pivotable with a pivot shaft 38A as a center. That is, a portion between the pivot shaft 35A of the door 35 and the link shaft 37A, the connection link 37, and a portion between the link shaft 37B of the pivot link 38 and the pivot shaft 38A form a four-joint link mechanism.

By the four-joint link mechanism as described above, in conjunction with an opening and closing of the door 35, the pivot link 38 pivots with the pivot shaft 38A as a center, and the link member 36 that engages with the pivot link 38 moves in the front-back direction. The link member 36 has a function similar to the link member 30 of the first embodiment, and, when the link member 36 moves in the front-back direction, the nip pressure in the fixing nip N2 changes.

To be noted, while, in this variant example, the configuration using the four-joint link mechanism is described as an example, it is not limited to this. For example, it is acceptable to configure such that the link member 36 is operated in conjunction with the door 35 using other mechanisms such as gears and pulleys. Further, such link mechanisms and interlock mechanisms are, of course, also applicable to the first embodiment.

Second Embodiment

While, next, a second embodiment of this disclosure will be described, in the second embodiment, a fan 40 is added to the first embodiment, and the configuration of the link member is changed. Therefore, configurations similar to the first the embodiment will be described by omitting illustrations or putting the same marks on drawings herein.

Figure 10A:
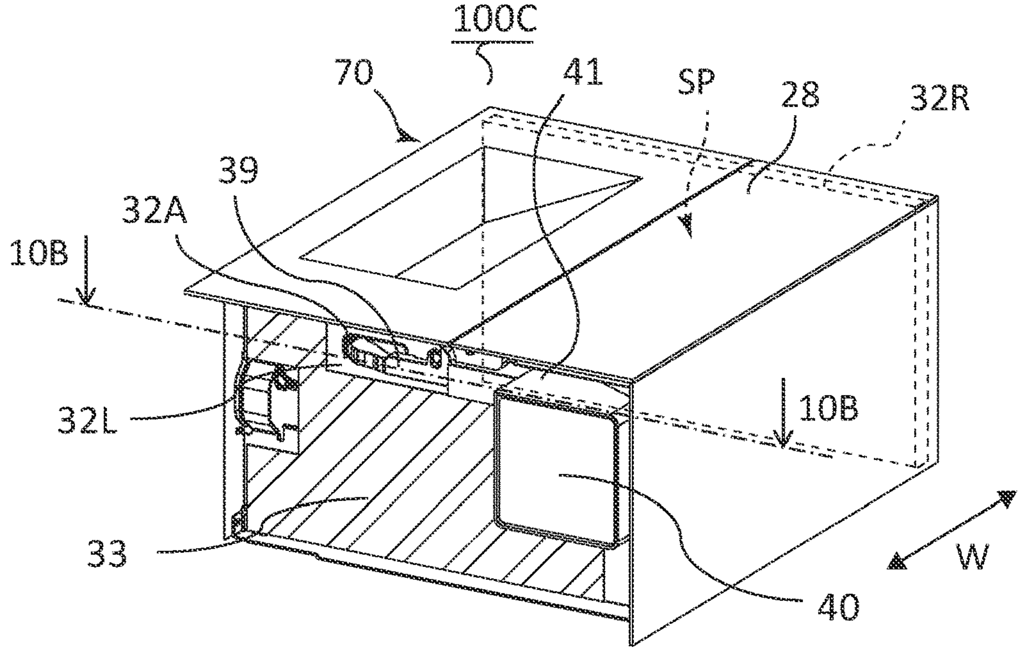
FIG. 10A is a perspective view illustrating an adjacent configuration of a link member of a second embodiment.
Figure 10B:
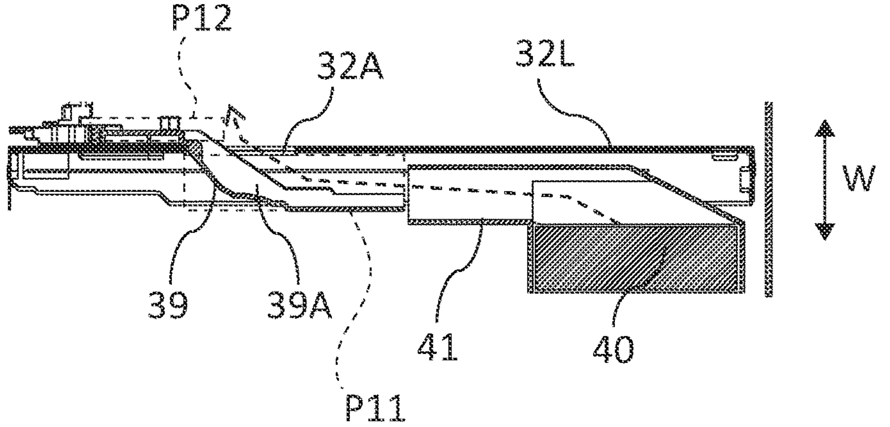
FIG. 10B is a cross-sectional view illustrating a cross section taken along the plane 10B-10B of FIG. 10A.
Figure 10C:
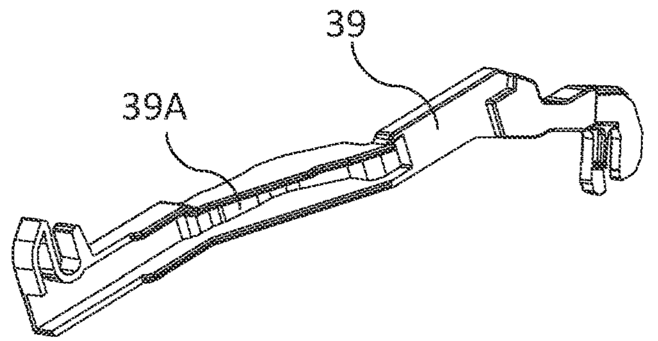
FIG. 10C is a perspective view illustrating the link member.

FIG. 10A is a perspective view illustrating an adjacent configuration of a link member 39, and FIG. 10B is a cross-sectional view illustrating a cross section taken along the plane 10B-10B in FIG. 10A. FIG. 10C is a perspective view illustrating the link member 39. To be noted, FIGS. 10A and 10B illustrate the view with the exterior cover of the side surface of the casing 70 disassembled.

As illustrated in FIGS. 10A and 10B, a printer 100C of the second embodiment includes a duct 41. The fan 40 and the duct 41 are secured to the left side plate 32L, and arranged on the opposite side of the right side plate 32R with respect to the left side plate 32L in the width direction W. In the present embodiment, the link member 39 is arranged so as to penetrate the through hole 32A disposed in the left side plate 32L, and the link member 39, serving as the connection portion, has a function similar to the link member 30 of the first embodiment. That is, the link member 39 connects the door 28 and the nip pressure change unit 60 (refer to FIG. 3) such that the nip pressure in the fixing nip N2 changes in conjunction with the opening and closing of the door 28. As with the first embodiment, the link member 39 includes a first portion P11 arranged on the opposite side of the right side plate 32R with respect to the left side plate 32L in the width direction W, and a second portion P12 arranged on the same side as the right side plate 32R with respect to the left side plate 32L in the width direction W.

By the rotation of the fan 40, airflow is created. Then, air sent from the fan 40 is guided to the back of the apparatus by the duct 41, and is discharged to the link member 39. As illustrated in FIG. 10C, the link member 39 includes a guide portion 39A that guides a part of the air sent from the fan 40 to the space SP inside of the casing 70. The guide portion 39A is arranged in a position through which the link member 39 penetrates the through hole 32A, and, in the present embodiment, has a groove shape. In other words, the guide portion 39A is formed in a substantially U-shaped cross section.

Thereby, a part of the air discharged from the duct 41 is sent to the electric board 33 along the link member 39 and the left side plate 32L. Further, a part of the air discharged from the duct 41 is guided to the space SP, namely, the inside of the casing 70, by the guide portion 39A of the link member 39 as shown by a dashed arrow illustrated in FIG. 10B. Therefore, it is possible to efficiently cool both the electric board 33 and the inside of the casing 70 by the single fan 40. Further, since, by disposing the guide portion 39A in the link member 39, the guide portion 39 acts as an airflow guide member, it is possible to reduce cost by reducing the number of components.

To be noted, while, in the second embodiment, the guide portion 39A is formed in the groove shape, it is not limited to this. For example, the guide portion 39 may be formed in a tubular shape or an L-shape.

OTHER EMBODIMENTS

To be noted, while, in any of the embodiments described above, the heater 19 directly comes into contact with the film 18, it is not limited to this. For example, it is acceptable to dispose a sheet material with high thermal conductivity, such as an iron alloy and aluminum, between the heater 19 and the film 18.

Further, while, in any of the embodiments described above, the heating unit 16 is urged toward the pressing roller 17, it is not limited to this. For example, it may be configured such that the pressing roller 17 is urged toward the heating unit 16, and, also in this case, it may be configured such that the nip pressure in the fixing nip N2 is changed by the nip pressure change unit 60.

Further, while the heating unit 16 is configured to heat the film 18, it is not limited to this. For example, the heating unit 16 may be constituted from a heating roller incorporating the heater 19. Further, various types of heaters such as ceramic heaters, carbon heaters, or halogen heaters can be applied to the heater 19. Further, it is acceptable to configure such that the heating unit 16 heats a heating layer of a belt by electromagnetic induction heating.

Further, while, in any of the embodiments described above, the link members 30, 36, and 39 are disposed on a side of the left side plate 32L, it is not limited to this. For example, the link members 30, 36, and 39 are disposed on a side of the right side plate 32R. In this case, a through hole through which the link members 30, 36, and 39 penetrate is disposed in the right side plate 32R. Further, the link members 30, 36, and 39 may be disposed on both sides of the left and right side plates 32L and 32R.

Further, while, in any of the embodiments described above, the link members 30, 36, and 39 are constituted from a single member, it is not limited to this. For example, the link members 30, 36, and 39 may be constituted from a plurality of members.

Further, while, in any of the embodiments described above, the through hole 32A is formed in a shape of a hole, it is not limited to this. For example, instead of the through hole 32A, a notch may be disposed on the left side plate 32L.

Further, while, in any of the embodiments described above, the nip pressure change unit 60 changes the nip pressure in a state in which the heating unit 16 and the pressing roller 17 come into contact with each other, it is not limited to this. For example, it is acceptable to configure the nip pressure change unit 60 such that the heating unit 16 and the pressing roller 17 are separated from each other when the door 28 is opened. To be noted, in a state in which the heating unit 16 and the pressing roller 17 are separated from each other, the nip pressure in the fixing nip N2 becomes 0.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-012672, filed Jan. 31, 2023, which is hereby incorporated by reference herein in its entirety.

What is claimed is:

1. An image forming apparatus comprising:

a casing including a first side plate and a second side plate, the first side plate and the second side plate being aligned in a predetermined direction;

a cartridge including an image bearing member that bears a toner image, the cartridge being attachable in the casing in a position between the first side plate and the second side plate and being detachable from the casing;

an exposure unit arranged between the first side plate and the second side plate, the exposure unit being configured to form an electrostatic latent image on the image bearing member by exposing the image bearing member;

a transfer unit configured to transfer the toner image borne on the image bearing member onto a sheet;

a fixing unit including:

a heating unit including a heater; and a pressing roller configured to form a fixing nip with the heating unit, the fixing unit being configured to fix the toner image transferred onto the sheet on the sheet by applying heat and pressure in the fixing nip;

a nip pressure change unit configured to change a nip pressure with which the fixing unit nips the sheet in the fixing nip;

a door configured to move to a closed position in which the door is closed with respect to the casing, and an opening position in which the door is opened with respect to the casing, the door being moved from the closed position to the opening position in a case where the cartridge is removed from the casing; and a connection portion configured to connect the door and the nip pressure change unit, the connection portion being configured to operate the nip pressure change unit such that the nip pressure is decreased in a case where the door moves from the closed position to the opening position, wherein the first side plate includes an opening portion, wherein the connection portion is arranged so as to penetrate the opening portion, and includes:

a first portion arranged on an opposite side of the second side plate with respect to the first side plate in the predetermined direction; and a second portion arranged on a same side as the second side plate with respect to the first side plate in the predetermined direction, and wherein at least a part of the second portion is arranged so as to overlap with the exposure unit when viewed in the predetermined direction, and is arranged between the first side plate and the exposure unit in the predetermined direction.

2. The image forming apparatus according to claim 1, wherein the second portion of the connection portion is arranged so as not to interfere with a movement locus of the cartridge in a case where the cartridge is attached and detached with respect to the casing.

3. The image forming apparatus according to claim 1, wherein a width of the exposure unit is smaller than a width of the cartridge in the predetermined direction.

4. The image forming apparatus according to claim 1, further comprising a board arranged on the opposite side of the second side plate with respect to the first side plate in the predetermined direction, the board being arranged so as not to interfere with the first portion of the connection portion.

5. The image forming apparatus according to claim 4, wherein the board is arranged so as to overlap with the second portion of the connection portion when viewed in the predetermined direction.

6. The image forming apparatus according to claim 1, wherein the opening portion of the first side plate is arranged above the image bearing member in a vertical direction.

7. The image forming apparatus according to claim 1, wherein the nip pressure change unit includes:

a first cam arranged on a first side with respect to the fixing unit in the predetermined direction;

a second cam arranged on a second side with respect to the fixing unit in the predetermined direction; and a camshaft configured to connect the first cam and the second cam, and wherein the camshaft is arranged above the fixing nip in a vertical direction.

8. The image forming apparatus according to claim 1, wherein the first portion includes a first engagement portion that is configured to engage with the door, and wherein the second portion includes a second engagement portion that is configured to engage with the nip pressure change unit.

9. The image forming apparatus according to claim 8, wherein the door includes an engaged portion that is configured to engage with the first engagement portion, and wherein, when the door moves between the closed position and the opening position, the engaged portion moves along a horizontal direction.

10. The image forming apparatus according to claim 1, wherein the door constitutes a part of a top surface of the casing in the closed position.

11. The image forming apparatus according to claim 1, wherein the door constitutes a part of a side surface of the casing in the closed position.

12. The image forming apparatus according to claim 1, further comprising a fan arranged on the opposite side of the second side plate with respect to the first side plate in the predetermined direction, the fan being configured to create airflow, wherein the connection portion includes a guide portion that is configured to guide a part of air sent from the fan to an inside of the casing via the opening portion.

13. The image forming apparatus according to claim 12, wherein the guide portion penetrates the opening portion.

14. The image forming apparatus according to claim 1, wherein the first side plate and the second side plate extend along a plane perpendicular to the predetermined direction.

15. The image forming apparatus according to claim 1, wherein the predetermined direction is a direction along a rotational axis of the image bearing member.

* * * * *